(12) United States Patent
Verrijp

(10) Patent No.: US 6,375,560 B1
(45) Date of Patent: Apr. 23, 2002

(54) HANGER FOR POULTRY

(75) Inventor: Bastiaan Verrijp, Numansdorp (NL)

(73) Assignee: Systemate Group B.V., Numansdorp (NL)

(*) Notice: Subject to any disclaimer, the term of this patent is extended or adjusted under 35 U.S.C. 154(b) by 0 days.

(21) Appl. No.: 09/694,294

(22) Filed: Oct. 23, 2000

(30) Foreign Application Priority Data

Oct. 28, 1999 (NL) ............................................ 1013419

(51) Int. Cl.[7] ........................ A22C 18/00; A22C 21/00; A22B 1/00; A22B 7/00
(52) U.S. Cl. ........................................ 452/187; 452/188
(58) Field of Search ................................ 452/188, 187, 452/189, 190

(56) References Cited

U.S. PATENT DOCUMENTS

| | | | |
|---|---|---|---|
| 1,006,955 A | * 10/1911 | Lace | 452/190 |
| 2,438,608 A | 3/1948 | Johnson | |
| 2,584,377 A | 2/1952 | Wunderlich | |
| 2,614,287 A | * 10/1952 | Crane | 452/188 |
| 2,625,707 A | 1/1953 | Littjohann | |
| 2,644,981 A | 7/1953 | Crane | |
| 2,688,765 A | * 9/1954 | Sharp et al. | 452/188 |
| 2,731,665 A | * 1/1956 | Zebarth | 294/87.2 |
| 3,152,360 A | 10/1964 | Fox et al. | |
| 4,215,654 A | * 8/1980 | Parker, Jr. | 452/188 |
| 4,646,384 A | * 3/1987 | van der Eerden | 452/188 |
| 5,505,657 A | * 4/1996 | Janssen et al. | 452/188 |

* cited by examiner

Primary Examiner—Charles T. Jordan
Assistant Examiner—Judith A Nelson
(74) Attorney, Agent, or Firm—Thomas, Kayden, Horstemeyer & Risley

(57) ABSTRACT

Device for hanging conveyance of poultry, comprising a hanger, which is possibly provided with means for attachment to an overhead conveyor, in which the hanger is provided with at least one accommodation space for a leg of the poultry, which accommodation space is provided with an access opening for entrance and exit of leg, in which the hanger is provided with means for closing off the access opening, which closing means are moveable between a closed position which closes off the access opening and an open position releasing the access opening, and with means for locking the closing means in the closed position.

31 Claims, 4 Drawing Sheets

HANGER FOR POULTRY

CROSS-REFERENCE TO RELATED APPLICATION

This application is related to, and claims priority to pursuant to 35 U.S.C. §119, the copending Netherlands utility patent application entitled "Hanger for Poultry" filed on Oct. 28, 1999 and accorded serial number 1013419, which is entirely incorporated herein by reference.

The invention relates to a hanger for poultry, in particular—though not exclusively—for live poultry, during a slaughtering process. The invention furthermore relates to a method in which the hanger can be advantageously deployed, as well as to parts of the hanger.

The slaughtering process for poultry usually starts by hanging the poultry from an overhead conveyor, by means of which the poultry is transported through a station in which the poultry is killed as quickly and as painlessly as possible. After that the poultry is plucked and further processed.

The overhead conveyor is provided with a series of hangers, in which the legs of the poultry can be hung. The abattoir assistants pick up the poultry, turn it upside down, and subsequently insert the legs in the accommodation spaces for that purpose of the hanger.

When it regards dead poultry, usually use can be made of hangers having simple, slit-shaped leg accommodation spaces, into and out of which accommodation spaces the legs can simply be slid. When it regards (still) live poultry it is less simple however. Live poultry can still move its legs, as a result of which there is the risk that a leg gets out of the hanger, resulting in the orientation of the poultry not corresponding to the further process and the animal suffering pain unnecessarily. Moreover, an efficient process is disturbed in this way.

It was attempted to give a first solution to this problem by means of hangers having leg accommodation spaces opening upwardly inclined. The legs were forcefully hung in them, which caused the animals a lot of pain, but moreover said hangers did still not ensure the wanted reliability.

As a solution to this, in the past, hangers were used that were provided with locking means for the legs, in which the hangers were provided with a horizontally turned plate member, with in it two accommodation spaces for the legs facing each other in an inclined manner, and two spring loaded, rotatable V-shaped plates which also defined an accommodation space for the legs. The legs were inserted in the accommodation spaces of the V-shaped plates, exerting a pressure force on the springs, the V-shaped plates were rotated until both accommodation spaces coincided, after which the V-shaped plates were released and the legs were kept clamped between the edges of both coinciding accommodation spaces. A drawback of this however was the complex construction that was difficult to clean, but particularly that the clamping force exerted on the legs could be felt by the poultry and even regularly led to fracture, as a result of which it suffered pain and became subject to stress.

An object of the invention is to improve on this. To that end a device is provided for hanging conveyance of poultry, comprising a hanger, which is possibly provided with means for attachment to an overhead conveyor, in which the hanger is provided with at least one accommodation space for a leg of the poultry, which accommodation space is provided with an access opening for entrance and exit of leg, in which the hanger is provided with means for closing off the access opening, which closing means are moveable between a closed position which closes off the access opening and an open position releasing the access opening, and with means for locking the closing means in the closed position.

By closing the access opening of the accommodation space using locking means provided on the hanger, the leg in question is kept locked in a constructive manner, without having to touch the leg. On the one hand the suffering of animals is reduced, on the other hand a more reliable locking is obtained as it is technically controllable.

It is noted that it is known per se, when transferring carcasses of slaughtered poultry in the slaughtering process, to make use of hangers with accommodation spaces, in which the legs are kept snugly in the accommodation spaces by means of an arm arranged on the hanger, which when placing the leg can be pressed out of the way and which springs back behind the leg with a widened end. When removing the leg the spring arm is pressed away of its own accord.

Preferably the device according to the invention is further provided with means for locking the closing means in the open position, so that insertion is promoted and unnecessary touching of the poultry is prevented.

The controllability is increased when the closing means can be moved between the closed position and the open position by means of rotation, and to that end preferably are connected to the hanger by means of a pivot pin connection.

In that case it is advantageous when the closing means are provided with an operating lever, which can be engaged by hand or by means of further operating means provided on the slaughter line.

Preferably the closing means are provided with a first ramp surface which in the open position coincides with the accommodation space, as seen in a view transverse to the accommodation space and having a normal with a component opposing the entrance direction and a component opposing the closing rotation direction. In this way the closing means can be activated as of its own accord during the entering movement of the leg.

Preferably the closing means are provided with a second ramp surface which in the closed position is situated in front of the accommodation space, in line therewith, as seen in a view transverse to the accommodation space and having a normal with a component opposing the entrance direction and a component opposing the opening rotation direction. In case the closing means still close off the access opening, they can be pressed out of the way with the entering movement of the leg, as a result of which the number of actions can be reduced.

Preferably the closing means are provided with a third ramp surface which in the closed position limits the accommodation space in outward direction, in line therewith, as seen in a view transverse to the accommodation space and having a normal with a component opposing the exit direction and a component opposing the closing rotation direction. As a result a returning movement of the leg in the accommodation space will not lead to releasing the access opening, but instead the closure will be enhanced.

Preferably the locking means comprise spring means for biassing them in a locking position, so that unintended release is further prevented. It is advantageous here when the locking means comprise one or several notches, which for locking cooperate with a cam provided on the hanger, in which way a simple construction is obtained, which can be cleansed easily.

Constructive simplicity is further promoted when the spring means are formed by a recess of material in the closing means.

In case of the aforementioned pivot pin, the spring means preferably are situated at the side of the pivot pin which faces away from the accommodation space.

Further constructive simplicity is realised when the recess of material is a curved slot, of which the hollow side of the curve is situated at the pivot pin side, and preferably the curvature centre coincides with the pivot axis.

In a further development of the device according to the invention it is provided that the accommodation space is elongated, having a width which is smaller than the ankle joint or leg end. As a result the leg has some freedom of movement, as a result of which the animal in question will suffer pain less quickly, in case of a live animal. In case of a slaughtered animal some compliance is provided in this way.

In a further development of the device according to the invention the hanger is provided with a portion which is substantially horizontally positioned during use, in which portion the accommodation space is provided. As a result the transfer of the poultry from the hanger according to the invention to a subsequent hanger is facilitated, and this can take place by means of easily applied horizontal sliding forces.

Preferably the closing means are formed by a plate-shaped, preferably hook-shaped closing body, which can easily be formed and cleansed. Said plate body can easily be made of synthetic material, for instance by moulding.

The hanger according to the invention preferably comprises two accommodation spaces, one for each leg.

In a possible embodiment the accommodation spaces are formed in one single transverse plate. Alternatively the accommodation spaces are formed in legs hanging down from the hanger, as a result of which an intermediate space is left between the legs which can be used for stationary parts of the slaughter line.

Preferably the legs are hinged to the hanger, so that the accommodation spaces if necessary can be brought into a advantageous orientation to the abattoir assistant during entering.

Preferably the closing bodies are arranged at the lower side of either the plate or the legs, so that more space is provided for the operational actions.

The invention further provides a method for hanging in particular live poultry, in which the poultry is hung in a hanger with the legs upwards, in which the legs are entered into accommodation spaces in question and are locked in there by means of closing means, which are locked only by constructive parts on the hanger.

Preferably the legs are offered a certain degree of freedom of movement during the presence in the accommodation spaces.

Although the hanger according to the invention can be used in various locations in the slaughter line, it is particularly advantageous when the poultry is killed and plucked during hanging.

The invention will be elucidated on the basis of a number of exemplary embodiments shown in the accompanying drawings, in which.

Figure 1:
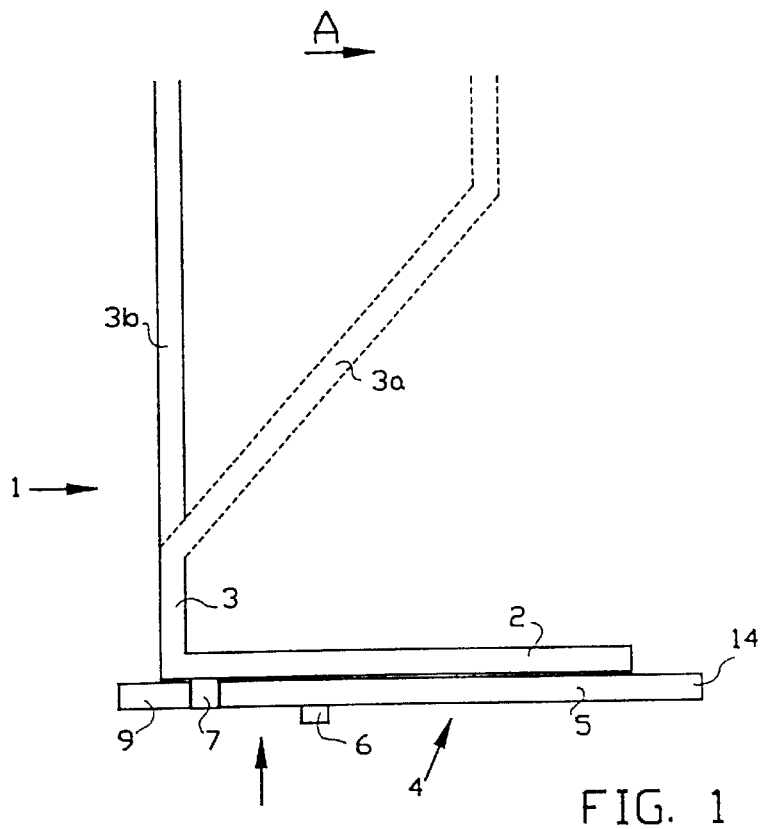
FIG. 1 shows a side view on a first embodiment of a hanger according to the invention.
Figure 4A:
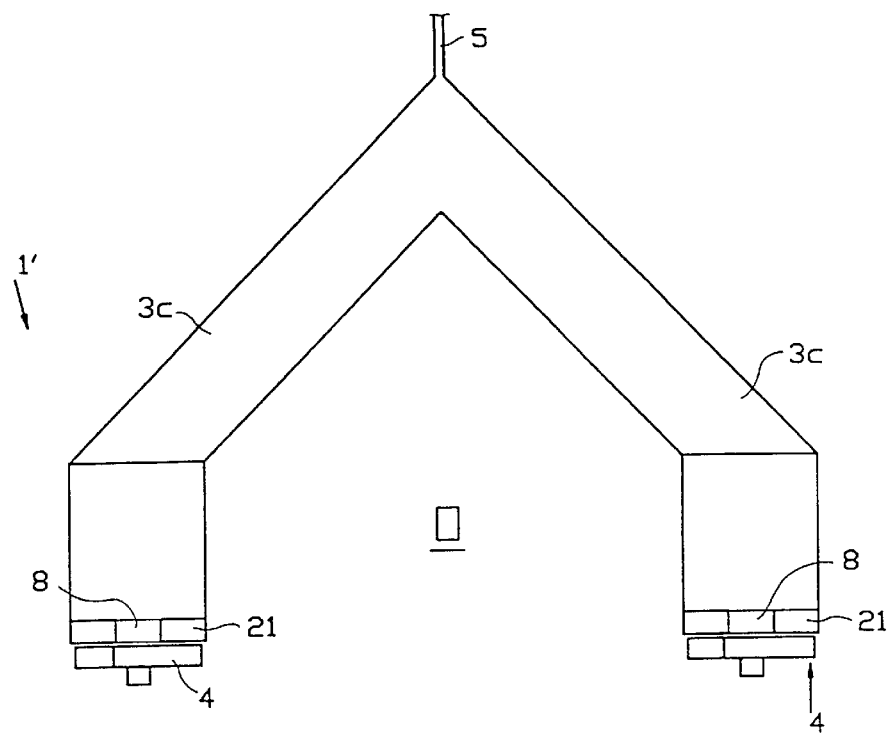
Figure 4B:
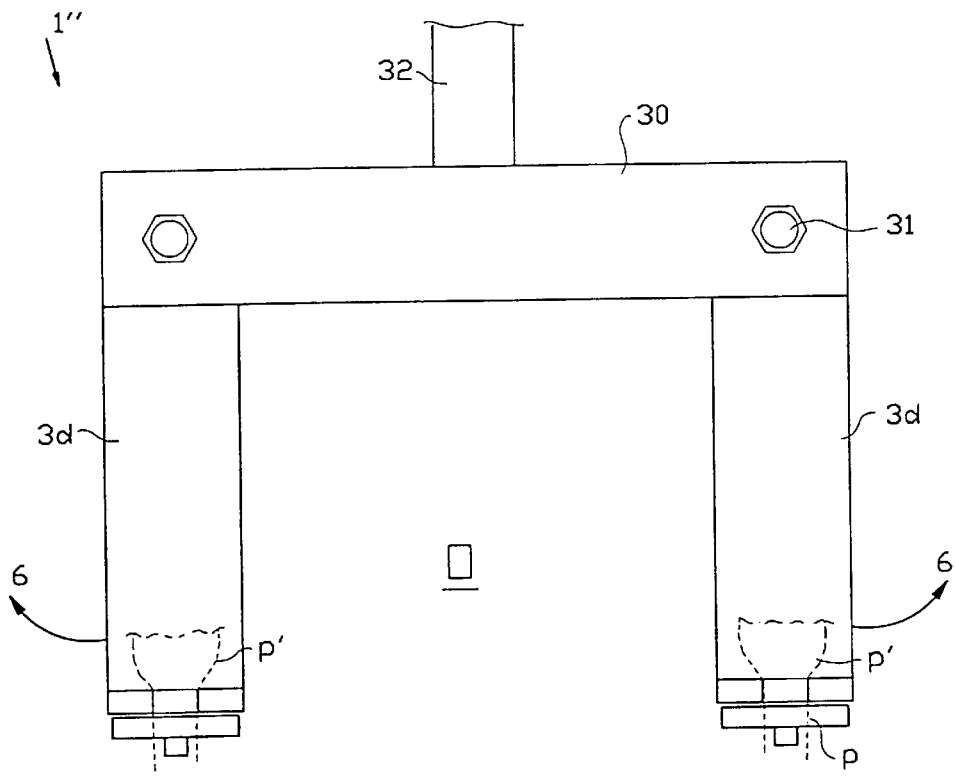
Figure 4C:
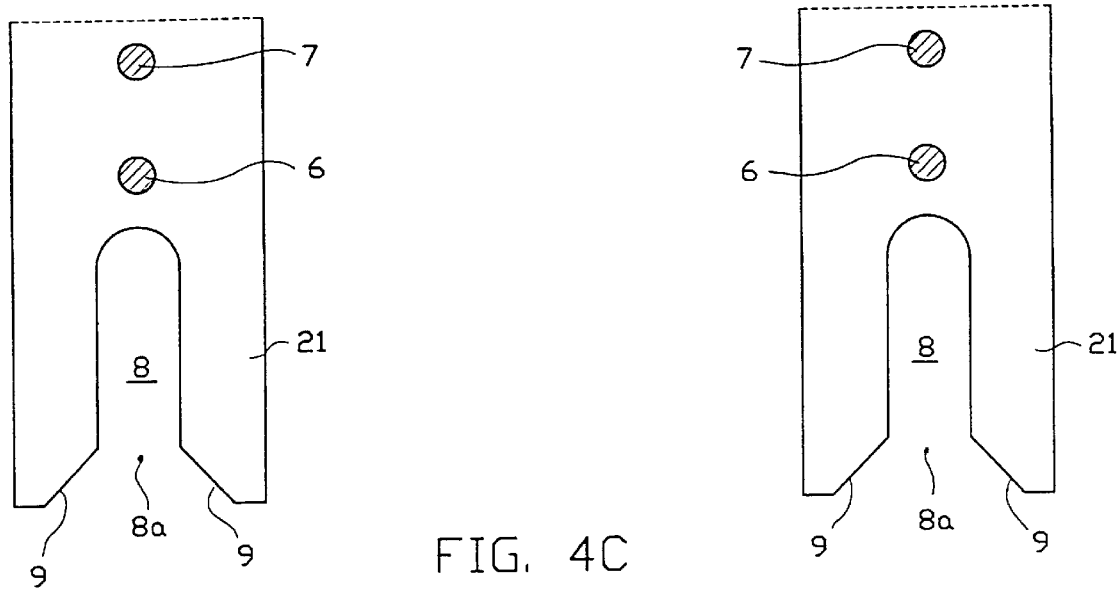
Figure 5:
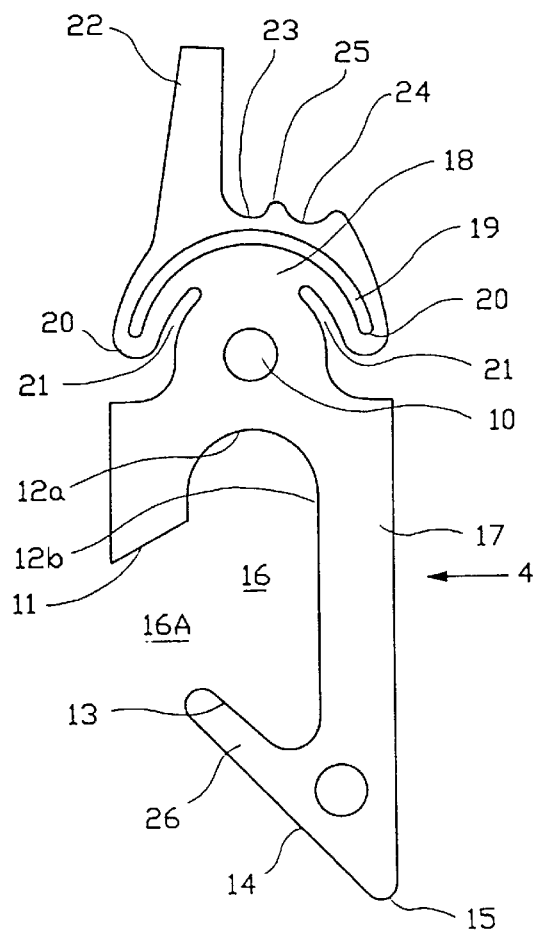
Figure 6:
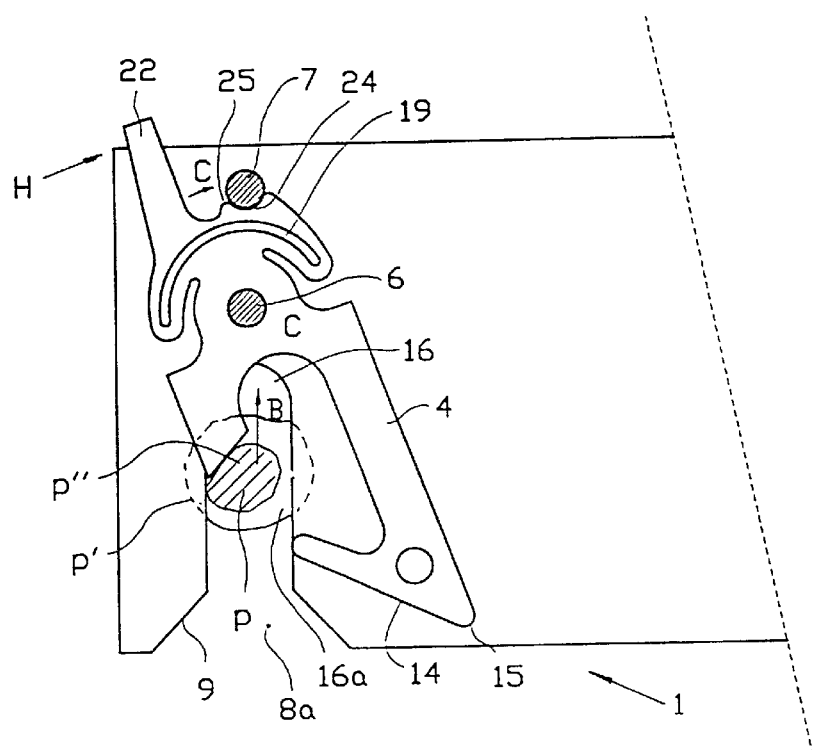

FIGS. 4A–C show a front view on an alternative embodiment of a hanger according to the invention, a front view on another alternative embodiment and a bottom view on the bottom side of said embodiments, however without the closing body, respectively;

FIG. 5 shows a view on a closing body according to the invention;

FIG. 6 shows a bottom view on the hanger of FIG. 1, during entering a leg; and

Figure 7:
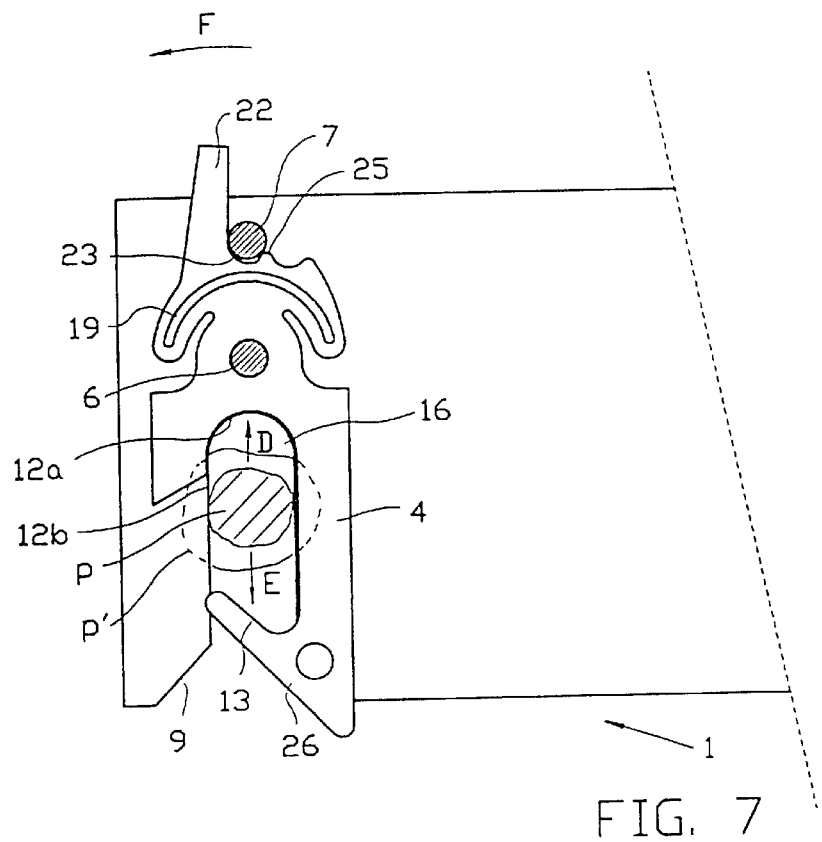

FIG. 7 shows a bottom view on the hanger of FIG. 1, after entering a leg.

Figure 2:
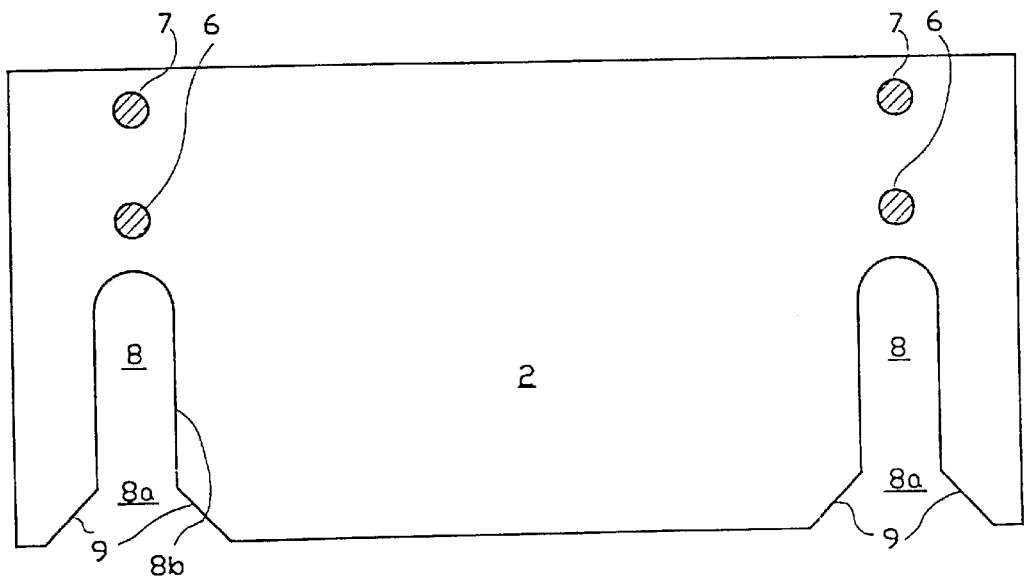
FIG. 2 shows a bottom view on the bottom plate of the hanger of FIG. 1, without closing body.

The hanger 1 shown in FIG. 1 is hung from an overhead conveyor which is not further shown and known per se. The hanger 1 is propelled in the direction A. The hanger 1 has a vertical hanging portion 3, which can be buckled (3a) or straight (3b). Below the hanging portion 3 is turned in a horizontal plate 2, which is shown more clearly in FIG. 2.

Figure 3:
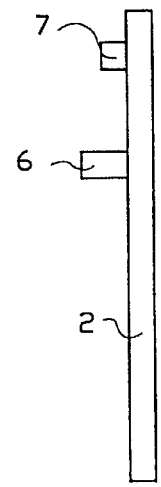
FIG. 3 shows a side view on the bottom plate of FIG. 2.

The horizontal plate 2 has two elongated accommodation spaces 8 which extend to the fore, are provided with access openings 8a and are bounded by edge 8a, and which accommodation spaces 8 at the front side are bounded by inclined pilot and insertion edges 9. The plate 2 has two pivot pins 6 extending downward and two locking pins 7 extending downward, as can also be seen in FIG. 3.

From the FIGS. 4A–C it can be derived that the plate 2 can also be divided into two plates 2', which have been arranged on the lower ends of the legs 3c or 3d, so that the hanger 1' (FIG. 4A) or 1" (FIG. 4B) encloses a free space O. In case of the hanger 1' an inverted V-shaped construction is obtained, which via upper end 5 is hung from an overhead conveyor in case of hanger 1" the legs 3d are connected to transverse beam 30 at the location of bolt connections 31 for hinging in the direction G, which beam is hung from an overhead conveyor via upper end 32.

As can be seen in FIG. 1 a closing plate 4 is attached to the lower surface of the plate 2, which plate 4 is shown further in FIG. 5. The closing plate 4 is hook-shaped, in which a hook member 17 and a locking member 18 can be discerned, which are situated on either side of the hole 10. With the hole 10 the closing plate 4 can be pressed on the pivot pin 6 and subsequently be secured on it against removal. A snap connection may possibly be used.

In the hook member 17 of the closing plate 4 an elongated enclosing space 16 is formed, which is bounded by the (first) inclined edge 11, bent edge 12a, straight edge 12b and returning (second) inclined edge 13, while releasing an access 16a. On the outer side yet a (third) inclined edge 14 is formed, the edges 13 and 14 defining a hook 26.

In the locking member 18 of the closing plate 4 an operating lever 22 is formed at the end, and more towards the hole 10 a circular slot 19, which continues in arcuate tongues 20, which protrude from the locking member 18 in order to define slits 21 for improving the resilience. At the outer edge two locking notches 23, 24 are formed, which are separated from each other by elevation 25.

The working is now elucidated with reference to FIGS. 6 and 7. For reasons of simplicity of the drawing only one half is shown for one leg.

The leg P of a piece of poultry, such as a live chicken or its carcass, is manually brought in front of the access opening 8a of the accommodation space 8, and is then slid in horizontal direction into the accommodation space 8 and through the opening 16a of the closing plate, until within the space 16. The thickened knuckle or ankle joint (the rest of the leg and the chicken is left out) P' of the leg P is held here above the plate 2. In this case the closing plate 4 is already placed in an inclined access position, in which the opening 8a is released. Because of engagement of the locking cam 7 in the notch 24 the closing plate is secured in this position.

In continuous movement of the leg P in the direction B it touches ramp surface 11, after which a transverse force is exerted on surface 11 and thus a tilting moment C on the closing plate 4 about pivot pin 6. The closing plate 4 however is initially prevented from pivoting by the locking on cam 7. The cam 7 however exerts a force on the edge of the notch 24, which leads to resilient deformation of the slit 19, such that the elevation can move below past the cam 7 and the cam can snap to notch 23. The stable locked closed position shown in FIG. 7 is then obtained, in which the leg 6 is accommodated in the accommodation space 8 and the space 16, and bounded in all directions by the edges 12a, 12b, 13 of space 16 and the edge 8b of the accommodation space 8, which together define a completely circumferential edge. The bounded space however is elongated, so that there is freedom of movement for the leg P in the directions D and E. When the leg P moves in the direction E it will abut surface 13, in which a closing moment is exerted on the closing plate. The knuckle or angle joint P' now unimpededly supports on the upper side of the plate 2 along the boundaries of the accommodation space 8. The chicken can now, as it were, hang freely from its legs.

When the chicken has to be released from the hanger 1 a moment F can be exerted on the lever 22 with the help of means that are part of the slaughter line, in order to, by pressing in the slit 19, rotate the closing plate back into the stable open position, in which the cam 7 then moves out of notch 23, over the elevation 25 and snaps into the notch 24. Possibly the lever 22 can then be manually operated.

When all this is arranged such that the hanger 1 arrives at the hanging location with the closing plate in the closed position, making use of the presence of the inclined surface 14 could be opted for, by pressing the leg P against it, as a result of which an opening moment F is exerted on the closing plate 4 and it is urged into the open position. After that the actions as described above are proceeded with.

What is claimed is:

1. Device for hanging conveyance of poultry, comprising a hanger, which is possibly provided with means for attachment to an overhead conveyor, in which the hanger is provided with at least one accommodation space for a leg of poultry, which accommodation space is provided with an access opening for entrance and exit of a leg, in which the hanger is provided with means for closing off the access opening to a sufficient degree such that reverse movement of a leg of poultry out of the accommodation space is prevented, which closing means are movable between a closed position which closes off the access opening and an open position releasing the access opening, and with means for locking the closing means in the closed position, wherein said means for locking are constructive parts on the hanger.

2. Device according to claim 1, furthermore provided with means for locking the closing means in the open position.

3. Device according to claim 1, in which the closing means can be moved between the closed position and the open position by means of rotation.

4. Device according to claim 3, in which the closing means are connected to the hanger by means of a pivot pin connection.

5. Device according to claim 3, in which the closing means are provided with an operating lever.

6. Device according to claim 3, in which the closing means are provided with a first ramp surface which in the open position coincides with the accommodation space, as seen in a view transverse to the accommodation space and having a normal with a component opposing the entrance direction and a component opposing the closing rotation direction.

7. Device according to claim 3, in which the closing means are provided with a second ramp surface which in the closed position is situated in front of the accommodation space, in line therewith, as seen in a view transverse to the accommodation space and having a normal with a component opposing the entrance direction and a component opposing the opening rotation direction.

8. Device according to claim 3, in which the closing means are provided with a third ramp surface which in the closed position limits the accommodation space in outward direction, in line therewith, as seen in a view transverse to the accommodation space and having a normal with a component opposing the exit direction and a component opposing the closing rotation direction.

9. Device according to claim 1, in which the locking means comprise spring means for biasing said locking means in a locking position.

10. Device according to claim 9, in which the locking means comprise one or several notches, which for locking cooperate with a cam provided on the hanger.

11. Device according to claim 10, in which the spring means are formed by a recess of material in the closing means.

12. Device according to claim 3, wherein the closing means are connected to the hanger by means of a pivot pin connection and the spring means are formed by a recess of material in the closing means, in which the spring means are situated at the side of the pivot pin which faces away from the accommodation space.

13. Device according to claim 12, in which the recess of material is a curved slot, of which the hollow side of the curve is situated at the pivot pin side, and preferably the curvature centre coinciding with the pivot axis.

14. Device according to claim 1, in which the accommodation space is elongated, having a width which is smaller than the leg end.

15. Device according to claim 1, in which the hanger is provided with a portion which is substantially horizontally positioned during use, in which portion the accommodation space is provided.

16. Device according to claim 1, in which the closing means are formed by a plate-shaped closing body.

17. Device according to claim 16, in which the closing body is substantially hook-shaped.

18. Device according to claim 16, in which the closing body is made of synthetic material.

19. Device according to claim 1, comprising two accommodation spaces.

20. Device according to claim 19, in which the accommodation spaces are formed in one single transverse plate.

21. Device according to claim 19, in which the accommodation spaces are formed in legs hanging down from the hanger.

22. Device according to claim 21, in which the legs are hinged to the hanger.

23. Device according to claim 16, in which the closing bodies are arranged at the lower side of either the plate or the legs.

24. Closing body suitable as closing means for the device according to claim 1.

25. Method for hanging poultry, in particular live poultry, in which the poultry is hung in a hanger with legs of said poultry upwards, in which the legs are entered into accommodation spaces and are locked therein by a closing means which closes off the accommodation spaces to a sufficient degree such that reverse movement of the legs out of the accommodation spaces is prevented, wherein said closing means are locked by only constructive parts on the hanger.

26. Method according to claim 25, in which the legs during the presence in the accommodation spaces are offered a certain degree of freedom of movement.

27. Method according to claim 25, in which the poultry is killed and/or plucked during hanging.

28. Device for hanging conveyance of poultry, comprising a hanger, which is possibly provided with means for attachment to an overhead conveyor, in which the hanger is provided with at least one accommodation space for a leg of poultry, which accommodation space is provided with an access opening for entrance and exit of a leg, in which the hanger is provided with means for closing off the access opening to a sufficient degree such that reverse movement of a leg of poultry out of the accommodation space is prevented, which closing means are movable by rotational means between a closed position which closes off the access opening and an open position releasing the access opening and which closing means are connected to the hanger by means of a pivot pin connection and a spring means is formed by a recess of material in the closing means, in which the spring means are situated at the side of the pivot pin which faces away from the accommodation space, and with means for locking the closing means in the closed position, wherein said means for locking are constructive parts on the hanger.

29. Device according to claim 28, in which the recess of material is a curved slot, of which the hollow side of the curve is situated at the pivot pin side, and preferably the curvature centre coinciding with the pivot axis.

30. Device according to claim 3, in which the accommodation space is provided in a plane and the closing means are rotatable about an axis perpendicular to the plane.

31. Device according to claim 19, in which the access openings of the two accommodation spaces are located on a same side of the hanger.

* * * * *